United States Patent
Kjær (10) Patent No.: US 10,557,459 B2
(45) Date of Patent: Feb. 11, 2020

(54) VERIFICATION OF WIND TURBINE NACELLE YAW POSITION SENSOR

(71) Applicant: Vestas Wind Systems A/S, Aarhus N. (DK)

(72) Inventor: Martin Ansbjerg Kjær, Harlev J. (DK)

(73) Assignee: Vestas Wind Systems A/S, Aarhus N. (DK)

( * ) Notice: Subject to any disclaimer, the term of this patent is extended or adjusted under 35 U.S.C. 154(b) by 325 days.

(21) Appl. No.: 15/508,267

(22) PCT Filed: Sep. 3, 2015

(86) PCT No.: PCT/DK2015/050259
§ 371 (c)(1),
(2) Date: Mar. 2, 2017

(87) PCT Pub. No.: WO2016/050249
PCT Pub. Date: Apr. 7, 2016

(65) Prior Publication Data
US 2017/0241409 A1    Aug. 24, 2017

(30) Foreign Application Priority Data
Sep. 29, 2014  (DK) ................................ 2014 70597

(51) Int. Cl.
*F03D 7/00*  (2006.01)
*F03D 17/00*  (2016.01)
(Continued)

(52) U.S. Cl.
CPC ............... *F03D 17/00* (2016.05); *F03D 7/00* (2013.01); *F03D 7/0204* (2013.01); *F03D 7/048* (2013.01);
(Continued)

(58) Field of Classification Search
CPC .......... F03D 7/00; F03D 9/257; F03D 7/0204; F03D 7/048; G01P 13/02; G01P 21/00;
(Continued)

(56) References Cited

U.S. PATENT DOCUMENTS

| | | | | |
|---|---|---|---|---|
| 8,150,641 B2 * | 4/2012 | Morjaria | ................ | F03D 7/028 702/60 |
| 8,362,632 B2 * | 1/2013 | Nielsen | ................ | F03D 7/0204 290/44 |

(Continued)

FOREIGN PATENT DOCUMENTS

| | | |
|---|---|---|
| EP | 0869280 A2 | 10/1998 |
| EP | 2143939 A1 | 1/2010 |

(Continued)

OTHER PUBLICATIONS

Wind Modelling and its Possible Application to Control of Wind Farms (Year: 2008).*

(Continued)

*Primary Examiner* — Woody A Lee, Jr.
*Assistant Examiner* — Brian Christopher Delrue
(74) *Attorney, Agent, or Firm* — Wood Herron & Evans LLP (57) ABSTRACT

The invention relates to techniques for verifying a nacelle yaw position sensor installed on a wind turbine and for taking restorative action to control the nacelle yaw position. The invention relates to a method performing the comprising determining a first absolute wind direction signal associated with the first wind turbine; determining a second absolute wind signal direction signal associated with the plurality of other wind turbines; comparing the two wind direction signals; and issuing a nacelle yaw position sensor fault signal if the first signal is beyond a predetermined error range of the second signal. A benefit of the invention is that (Continued)

it enables the detection of an inaccurate nacelle yaw sensor without direct measurement or inspection.

15 Claims, 7 Drawing Sheets

(51) Int. Cl.
    *F03D 9/25*     (2016.01)
    *F03D 7/02*     (2006.01)
    *F03D 7/04*     (2006.01)
    *G01P 13/02*     (2006.01)
    *G01P 21/00*     (2006.01)

(52) U.S. Cl.
    CPC .............. *F03D 9/257* (2017.02); *G01P 13/02* (2013.01); *G01P 21/00* (2013.01); *F05B 2260/821* (2013.01); *F05B 2270/321* (2013.01); *F05B 2270/329* (2013.01); *F05B 2270/404* (2013.01); *Y02E 10/723* (2013.01); *Y02E 10/725* (2013.01)

(58) Field of Classification Search
    CPC .......... F05B 2260/821; F05B 2270/321; F05B 2270/329; F05B 2270/404; Y02E 10/723; Y02E 10/725
    USPC .......................................................... 416/35
    See application file for complete search history.

(56) References Cited

U.S. PATENT DOCUMENTS

| | | | |
|---|---|---|---|
| 9,377,007 B2* | 6/2016 | Zhu | F03D 7/043 |
| 10,060,412 B2* | 8/2018 | Hansen | F03D 7/0204 |
| 10,215,162 B2* | 2/2019 | Bai | F03D 17/00 |
| 2002/0029097 A1* | 3/2002 | Pionzio, Jr. | F03D 7/047 |
| | | | 700/286 |
| 2004/0230377 A1* | 11/2004 | Ghosh | F03D 7/0284 |
| | | | 702/3 |
| 2008/0078228 A1* | 4/2008 | Nies | G01D 3/08 |
| | | | 73/1.01 |
| 2010/0209246 A1* | 8/2010 | Migliori | F03D 7/0204 |
| | | | 416/1 |
| 2011/0098975 A1 | 4/2011 | Mazzaro et al. | |
| 2011/0133453 A1* | 6/2011 | Merswolke | F03D 9/25 |
| | | | 290/44 |
| 2011/0148112 A1* | 6/2011 | Ormel | F03D 7/042 |
| | | | 290/44 |
| 2011/0229322 A1* | 9/2011 | Tadayon | F03D 1/065 |
| | | | 416/91 |
| 2012/0066544 A1* | 3/2012 | Ichinose | G06F 11/2005 |
| | | | 714/4.12 |
| 2012/0101644 A1* | 4/2012 | Evans | G05B 13/026 |
| | | | 700/287 |
| 2013/0206836 A1* | 8/2013 | Paterson | F41G 3/08 |
| | | | 235/404 |
| 2013/0272878 A1* | 10/2013 | Zhu | F03D 7/043 |
| | | | 416/1 |
| 2014/0207296 A1* | 7/2014 | Kjær | F03D 7/0264 |
| | | | 700/287 |
| 2014/0239640 A1* | 8/2014 | Li | F03D 7/047 |
| | | | 290/44 |
| 2014/0241882 A1* | 8/2014 | Caruso | F03D 7/0268 |
| | | | 416/17 |
| 2014/0244188 A1* | 8/2014 | Bai | F03D 17/00 |
| | | | 702/60 |
| 2014/0348650 A1* | 11/2014 | Hansen | F03D 7/0204 |
| | | | 416/1 |
| 2015/0211486 A1* | 7/2015 | de Boer | F03D 7/0224 |
| | | | 290/44 |
| 2019/0048848 A1* | 2/2019 | Glavind | F03D 7/0204 |

FOREIGN PATENT DOCUMENTS

| | | | | |
|---|---|---|---|---|
| EP | 2314869 | A1 | 4/2011 | |
| EP | 2520794 | A1 * | 11/2012 | ........... F03D 7/0204 |
| EP | 2520794 | A1 | 11/2012 | |
| EP | 2631470 | A1 | 8/2013 | |
| EP | 2631471 | A1 | 8/2013 | |
| EP | 2674617 | A2 | 12/2013 | |
| EP | 2728175 | A1 | 5/2014 | |

OTHER PUBLICATIONS

European Patent Office, International Search Report and Written Opinion in PCT Application Serial No. PCT/DK2015/050259, dated Jan. 18, 2016.
Danish Patent and Trademark Office, Search Opinion in PA 2014 70597, dated Apr. 28, 2015.
Pierre-Elouan Mikael Rethore et al., Systematic Wind Farm Measurement Data Filtering Tool for Wake Model Calibration, EOW Conference 2009, 11 pgs.
European Patent Office, Communication of a Notice of Opposition in EP Application No. 15759376.5, dated Aug. 14, 2019.

* cited by examiner

VERIFICATION OF WIND TURBINE NACELLE YAW POSITION SENSOR

FIELD OF THE INVENTION

The invention relates to techniques for verifying a nacelle yaw position sensor installed on a wind turbine and for taking restorative action to control the nacelle yaw position.

BACKGROUND TO THE INVENTION

There are various types of wind turbines on the market. Of these, the horizontal axis wind turbine, or 'HAWT', is probably the most common and comprises a nacelle on top of a vertical tower. The nacelle supports a rotor having a set of blades which rotate about a horizontal axis.

For performance reasons it is important that the rotor is in alignment with the wind direction. In some HAWT designs the rotor is designed to be operated facing the wind, and in others the rotor is designed to operate facing in a 'downwind' direction.

In both of these configurations, the wind turbine includes a nacelle yaw control system which is operable to yaw the nacelle about the tower axis. The yaw control system uses wind direction information, for example from a nacelle-mounted anemometer and direction sensor to determine the wind strength and its direction relative to the yaw position of the nacelle. The yaw control system then is able to yaw the nacelle so that it faces into the wind, thereby maximising the power that the wind turbine is able to extract from the wind.

In performing the yaw control of the nacelle, the yaw control system must be provided with accurate position information about the nacelle. Without accurate information, there is a risk that yaw control system is unable to align the nacelle with the wind direction which may lead to a reduction in power generation efficiency. Also, it is important nowadays for a wind turbine to be able to determine the absolute wind direction, as opposed to the direction relative to the nacelle, since this parameter may be used for certain control strategies, such as wake reduction techniques for example. Absolute wind direction is usually determined by adding relative wind direction to the nacelle yaw position.

In a typical yaw control system, the nacelle position is derived from a sensor that monitors the movement of a tower-mounted yaw ring gear that is rotated by one or more motor-driven yaw pinions. Usually an optical or magnetic encoder sensor is used for this purpose. Rotational movement of one of the yaw drive pinions may also be measured.

Errors in the yaw measurement system can in certain circumstances accumulate into a significant yaw error which has a knock on affect particularly in the determination of a value of the absolute wind direction for the wind turbine. It will be appreciated from the above discussion that it would be desirable at least to detect when a yaw sensor is providing inaccurate data so that appropriate action can be taken. It would also be desirable to mitigate for the presence of the inaccurate data so that a given wind turbine in a wind farm always has an acceptably accurate measure of absolute wind direction available to it so that control objectives can be achieved.

It is against this background that the invention has been devised.

SUMMARY OF THE INVENTION

In a first aspect, the invention provides a method of verifying a nacelle yaw position sensor associated with a first wind turbine in a wind farm including a plurality of other wind turbines, the method comprising:

determining a first absolute wind direction signal associated with the first wind turbine;

determining a second absolute wind signal direction signal associated with the plurality of other wind turbines;

comparing the first absolute wind direction signal to the second wind direction signal; and issuing a nacelle yaw position sensor fault signal in the event that first absolute wind direction signal is beyond a predetermined error range of the second wind direction signal.

Note that the term 'plurality', as applied to the wind turbines in the wind farm, should not be taken to mean all of the other wind turbines in the wind farm.

A benefit of the invention is that it enables the detection of an inaccurate nacelle yaw sensor without direct measurement or inspection. Instead, data gathered from wind turbines throughout the wind park is used to pick up on measurement anomalies. Since inaccurate nacelle yaw sensors can be detected promptly, this enables remedial action to be taken quickly, thus improving the availability of accurate absolute wind direction data. This will improve the accuracy of a potential wind direction reporting function of the wind farm.

The invention can also be expressed as, and therefore also encompasses a wind farm including a first wind turbine and a plurality of other wind turbines, including a controller configured to perform the steps as defined above. It will be appreciated that the controller having this functionality may reside in the wind turbine, or in a wind farm control station, or alternatively the controller functionality may be distributed between once or more components of the wind farm, such as two or more wind turbines, or a central controller and a wind turbine, that are coupled together so that data can be shared.

The first aspect of the invention allows for verification of data from the nacelle yaw position sensor. Once a sensor has been determined as being inaccurate, one option is to shut down the turbine until the fault can be resolved. However, the invention also provides a technique to derive replacement nacelle yaw position data for a given wind turbine based on data that is received from the other wind turbines in the wind farm so that the replacement nacelle yaw position data can be used instead of the yaw position data measured by the yaw position sensor. To this end, in a second aspect, the invention provides a method of controlling a nacelle yaw system of a wind turbine within a wind farm having a plurality of wind turbines, the method comprising:

determining a relative wind direction signal associated with the wind turbine, determining an absolute wind direction signal associated with the plurality of wind turbines in the wind farm, determining an estimated nacelle yaw position signal based on the absolute wind direction signal and the relative wind direction signal, and using the estimated nacelle yaw position signal to control the nacelle yaw system.

The invention can also be expressed as, and therefore also encompasses a wind farm including a first wind turbine and a plurality of other wind turbines, including a controller configured to perform the steps as defined above.

Preferred and/or optional features of the invention are defined in the appended claims.

DETAILED DESCRIPTION OF EMBODIMENTS OF THE INVENTION

Figure 1:
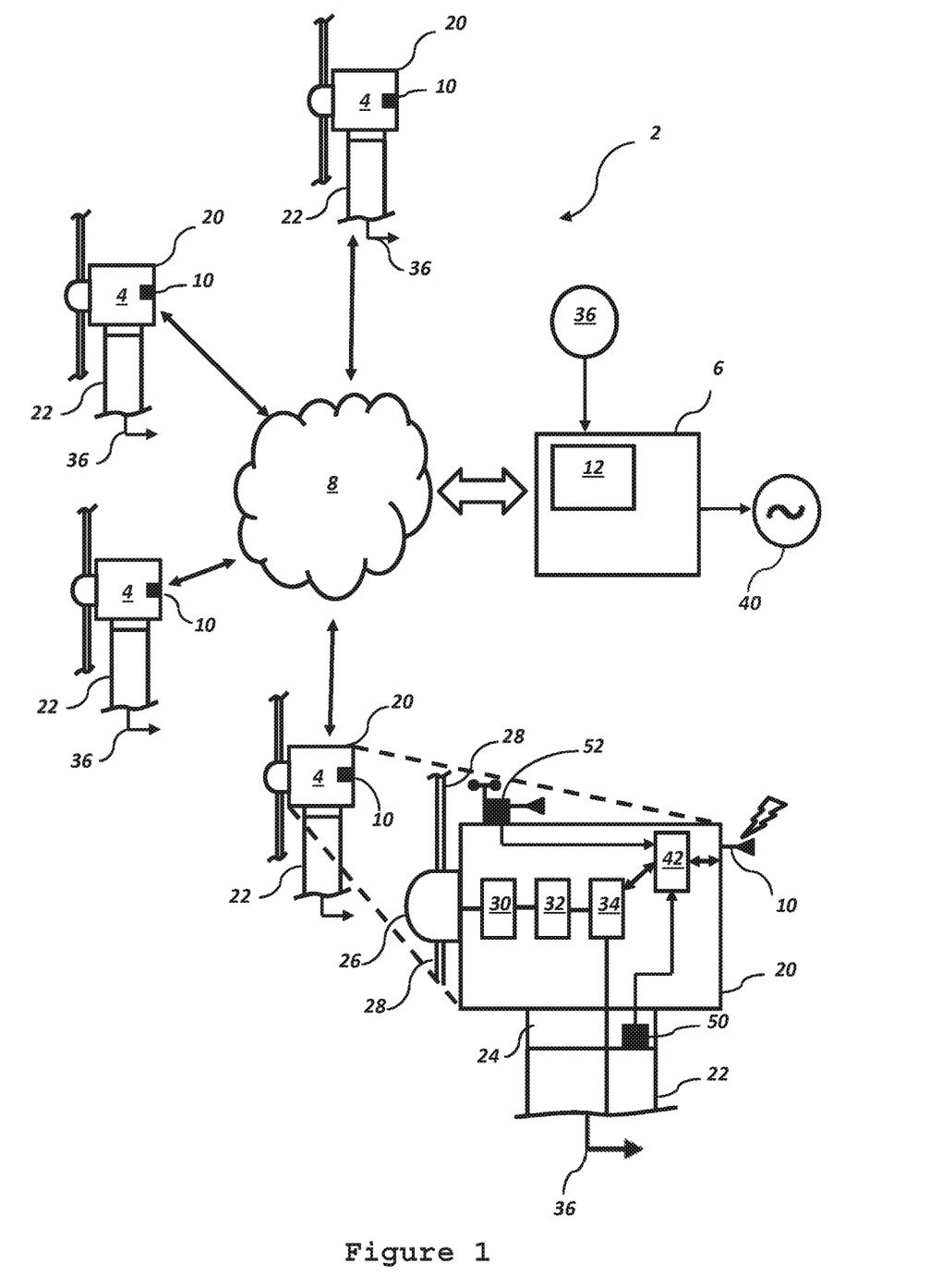
FIG. 1 is a schematic diagram of a wind farm.

With reference to FIG. 1, a wind farm 2 includes a plurality of wind turbines 4 and a central control station 6. The wind turbines 4 communicate with the central control station 6 across a data communications network 8.

The data communications network 8 provides connectivity between respective communication nodes 10 at each of the wind turbines 4 and a wind farm controller 12 that is located at the central control station 6. In the illustrated embodiment, the data communications network 8 is a wireless local area network (LAN), such as an Ethernet network using one of the IEEE 802.11 standards. However, a wired network would also be acceptable. The precise form of data communications network 8 is not central to the invention, so will not be described in detail here. However, the configuration of such a network is considered to be within the abilities of the skilled person or team, and is known generally in the field of wind farm design and installation.

The data communications network 8 therefore serves to connect the wind turbines 4 with the wind farm controller 12 so that the controller 12 can perform a supervisory control function over each of the wind turbines 4 in order to achieve its power supply objectives and to carry out performance monitoring and diagnostics for the farm as a whole. Such a system is commonly known as a SCADA (Supervisory Control And Data Acquisition) system and is known in the art.

At this point it should be noted that although FIG. 1 shows the wind farm 2 as comprising four wind turbines 4, this is for simplicity only and that in reality there would be many more wind turbines in the farm. Nowadays it is known for a wind farm to include over 100 wind turbines.

The inset panel in FIG. 1 shows one of the wind turbines 4 in an enlarged form so as to demonstrate some of its internal components. The other wind turbines can be assumed to have substantially the same configuration for the purposes of this discussion.

In overview, and as is conventional, the wind turbine 4 includes a nacelle 20 that is mounted on top of a tower 22. The nacelle 20 is mounted on the tower so that it can rotate about the major (vertical) axis of the tower 22 by way of a nacelle yaw control system 24.

The wind turbine 4 is a horizontal-axis wind turbine (HAWT) and, as such, the nacelle 20 supports horizontally-oriented hub 26 which carries a set of blades 28. The hub 26 is supported on the nacelle 20 by a main bearing (not shown) and is configured to drive a gearbox 30 and, in turn, a generator 32. The generator 32 outputs AC voltage and current to a power converter 34 which then outputs grid voltage by way of a grid side connection in the form of a cable 36. The grid side connections 36 are shown in FIG. 1 for each of the wind turbines 4 and are configured to feed into the central control station 6 which, in turn, provides the facility to supply a controlled power input to the grid 40.

The nacelle 20 also houses a controller 42 which is local to the wind turbine 4 and which is responsible for conducting all of the local command and control tasks such as controlling power output, controlling rotor speed, controlling blade pitch, communicating with the central control station 6, and the like. Although not shown in FIG. 1, it will be understood that the local controller 42 may carry out these functions by way of a control area network bus (CAN bus) rather than through direct connections with each component. It will also be understood that the illustration of the nacelle 20 and the components housed within it in FIG. 1 is simplified for this discussion and that the nacelle 20 would in reality include many other system components.

In the invention, the local controller 42 communicates with the yaw control system 24 in order to control the yaw position of the nacelle and, in this way, the local controller 42 is able to take the necessary action to yaw the nacelle 20 so that it faces into the wind to optimise power production. For this purpose the local controller 42 is configured to receive an input signal from a nacelle yaw position sensor 50 and a relative wind direction signal 51 from a wind sensor 52. As will be explained, in this way the local controller 42 is able to compute the absolute wind direction in the vicinity of the wind turbine 4 which is useful in the positioning of the nacelle and to achieve other control objectives. The wind sensor 52 could be any suitable sensor for detecting the direction of the local wind relative to the nacelle of the wind turbine. As shown, the wind sensor 52 is a combined anemometer and wind vane unit, but ultrasonic wind sensors are also known in the art.

As will be explained, the local controller 42 is also provided with the facility to verify the operation of the nacelle yaw position sensor 50 and to take appropriate action if it detects that its output signal is providing inaccurate data. Although one option here would be simply to place the wind turbine in a safe mode if the sensor 50 is determined to be faulty, in the invention the local controller 42 is equipped with the functionality to estimate its nacelle yaw position based on data that is received from the other wind turbines. As will be explained, this functionality may be provided at the local controller 42 or, alternatively, the functionality may be distributed between the local controller 42 and the wind farm controller 12 at the central control station 6.

Figure 2:
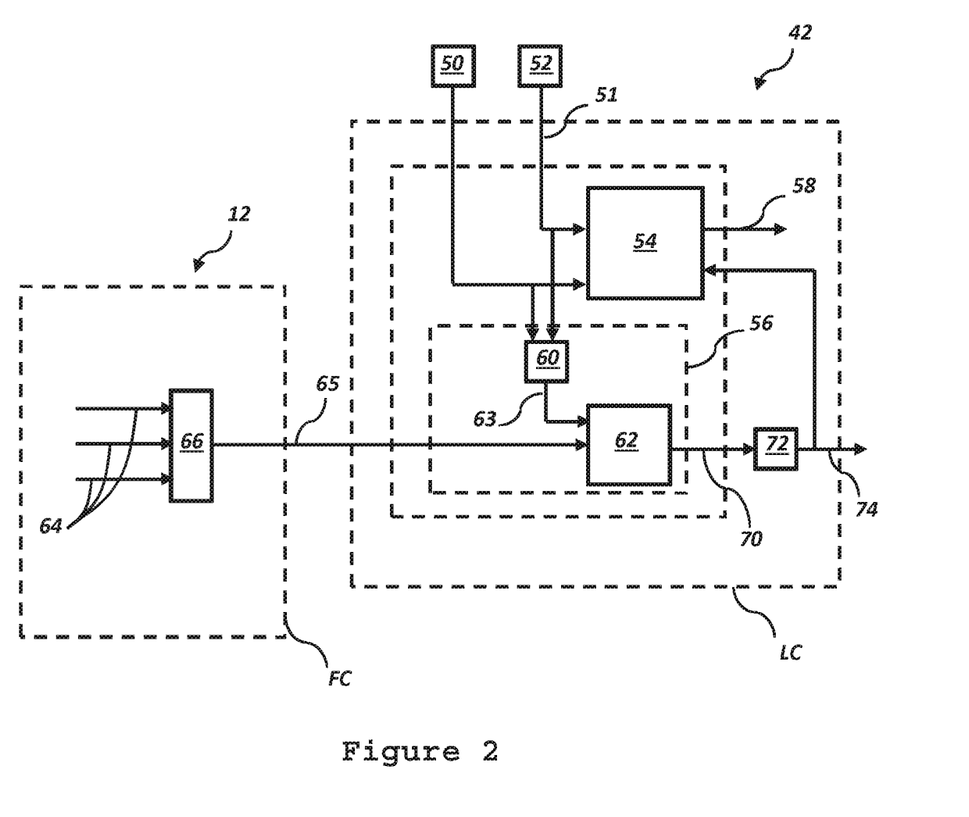
FIG. 2 is a schematic diagram of a system that is operable to identify a faulty nacelle yaw position sensor.
Figure 3:
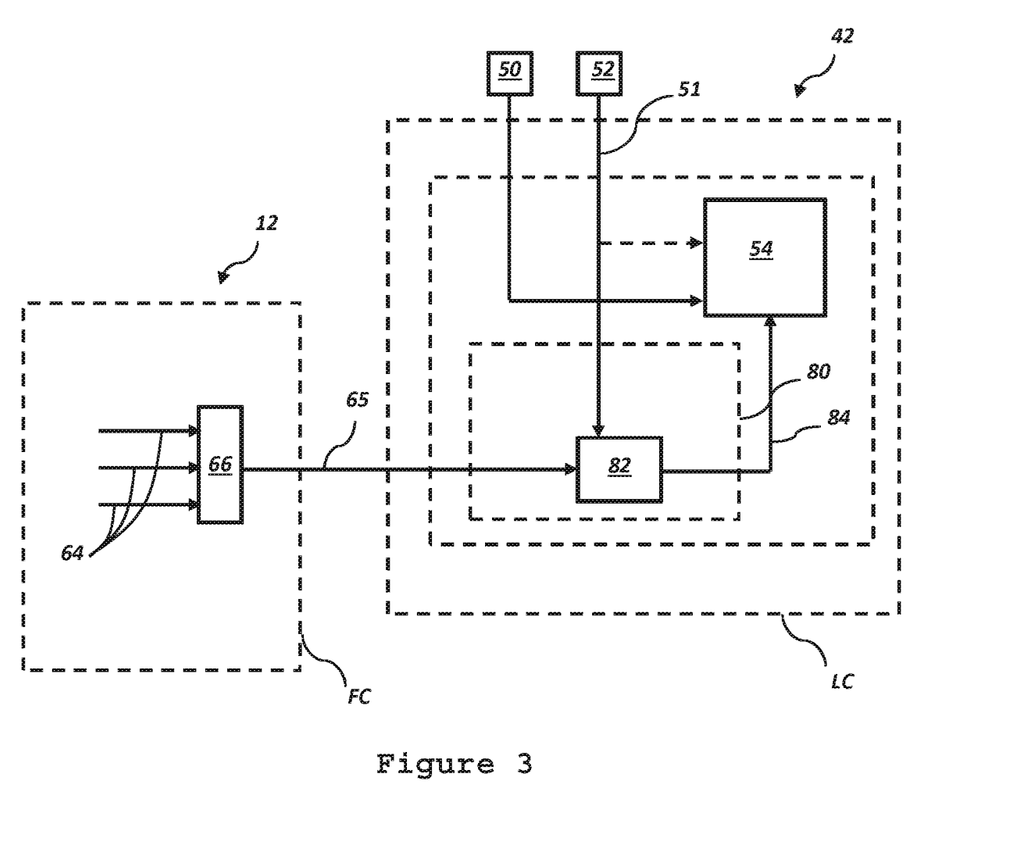
FIG. 3 is a schematic diagram of a system that is operable to estimate a nacelle yaw position.

One example is illustrated in the functional block diagrams of FIG. 2 and FIG. 3, in which the functionality of the wind farm controller 12 is represented by the system boundary labelled 'FC', whereas the functionality of the local controller 42 is represented by the system boundary labelled 'LC'. Therefore, it will be appreciated that in this embodiment functionality is split or distributed between the local controller 42 and the wind farm controller 12.

FIG. 2 illustrates a diagnostic function which is responsible for verifying the operation of the nacelle yaw position sensor 50 by detecting an error in the data it provides.

In overview, the local controller 42 is configured to compare the absolute wind direction as measured locally at the wind turbine 4, with an 'average' wind direction as derived from at least two of the other wind turbines in the wind farm 2. Based on the result of this comparison, the controller 42 is able to make the inference that the nacelle yaw position sensor is outputting inaccurate data is the compared signals differ by greater than a predetermined amount.

In more detail, the local controller 42 includes a control module 54 which is responsible for the general operation of the yaw control system 24, and a diagnostic module 56 which is responsible for monitoring the signals from the nacelle yaw position sensor 50 and the wind sensor 52 and issuing a reporting signal when it detects that the signal from the yaw position sensor 50 is considered to be faulty.

The control module 54 therefore receives respective signals from the yaw position sensor 50 and the wind sensor 52 and, based on these signals, implements stored control algorithms in order to control the yaw position of the nacelle 20 via a control output signal 58. The precise details of the control algorithms are not the focus of the invention and so will not be described in further detail here.

The diagnostic module 56 is operable to run alongside the control module 54 to determine that the nacelle yaw position sensor 50 is outputting inaccurate data. As has been mentioned above, the diagnostic module 56 is configured to compare the absolute wind direction as measured locally at the wind turbine 4, with an 'average' wind direction as derived from at least two of the other wind turbines in the wind farm 2. Therefore, the diagnostic module 54 combines the signals from the nacelle yaw position sensor 50 and the wind sensor 52 at addition module 60.

The output of the addition module 60 is a signal 63 representing the absolute wind direction local to the wind turbine 4, that is to say a measurement of the wind direction relative to the ground, which is then input into comparison module 62. The comparison module 62 also receives a signal 65 from the wind farm controller 12. The signal 65 that is output from the wind farm controller 12 represents an averaged value of the absolute wind direction for two or more of the other wind turbines 4 in the wind farm 2, as will now be explained.

In the illustrated embodiment, the wind farm controller 12 receives a plurality of absolute wind direction signals from the other wind turbines 4 in the wind farm, as indicated by the plurality of input arrows '64', and calculates an average value at averaging module 66. In this way, the absolute wind direction signals from the other wind turbines 4 are averaged to get an estimate of the true prevailing wind direction in the local area. Although a simple averaging of all the received signals 64 could be implemented, to improve the accuracy of the averaging calculation, the averaging module 66 may be configured to allocate weightings to the signals 64 depending on the proximity of the associated wind turbine from which the signal 64 is received. For example, signals 64 from nearby wind turbines may be given higher weightings than signals from turbines that are further away since it is likely that the absolute wind direction will be more similar for neighbouring wind turbines than for wind turbines that are spaced apart. Also, it is envisaged that a level of pre-processing may be performed on the signals 64 to remove 'outliers', i.e. those signals that deviate from the other signals by more than a predetermined threshold.

At this point, it should be noted that it is not essential that absolute wind direction data from all of the other wind turbines is input into the averaging module 66. Instead, only some of the wind turbines may be selected, perhaps because the wind direction at those particular sites is less changeable. At a basic level, it would be sufficient that two or more of the other wind turbines in the farm are used to derive average values of absolute wind direction although, in practice, the more wind turbines that contribute to the average absolute wind direction value will increase its accuracy.

Returning to the local controller 42, the comparison module 62 compares the values of absolute wind direction that it receives i) from the addition module 60 and ii) the from the wind farm controller 12 and determines whether the absolute wind direction signal from the addition module 60, that is to say the 'first absolute wind direction signal 63' is within a predetermined error range of the absolute wind direction signal received from the wind farm controller 60, i.e. the 'second absolute wind direction signal 65'.

In response to determining that the first absolute wind direction signal is beyond or 'outside' a predetermined error range of the second absolute wind direction signal, the comparison module 62 issues a fault detection signal, which is identified in FIG. 2 as '70'. Judging when the first absolute wind direction signal is outside an error range of the second absolute wind direction signal is a balance between detecting faults accurately, whilst avoiding triggering the fault detection unnecessarily. It is envisaged that acceptable results would be achieved if the error range is defined as the second absolute wind direction +/−20 degrees. That is to say, the fault would be triggered if the first absolute wind direction signal is more than 20 degrees greater than the second absolute wind direction signal, or more than 20 degrees less than the second absolute wind direction signal, i.e. the error range can be considered to be a 40 degree 'swing' about the value of the second absolute wind direction signal.

Preferably, it is envisaged that more accurate fault diagnosis would be achieved it the error range is about a 30 degrees 'swing' about the second absolute wind direction signal i.e. +/−15 degrees. However, currently it is envisaged that most preferred will be the error range being defined as +/−10 degrees. It should be appreciated that narrower error ranges are possible.

It will be appreciated that the above calculation is based on the premise that the wind direction across the wind farm will be more or less the same for all of the wind turbines. Therefore, if the nacelle yaw position sensor 50 for the wind turbine 4 under consideration is operating correctly, then the absolute wind direction signal specific to that wind turbine which is calculated by combining the relative wind direction measured by the wind sensor and the nacelle yaw position measured by the yaw position sensor should be approximately the same as the averaged absolute wind direction for the rest of the turbines in the wind farm.

Various actions may be taken upon triggering of the fault detection signal 70. One option is that the local controller 42 would send, via a fault reporting module 72, a fault report signal 74 to the wind farm controller 12 as part of the overall SCADA system. A fault would then be logged for investigation by maintenance personnel at the appropriate time. To avoid the fault detection being triggered unnecessarily, the calculation module 62 may be configured to issue the fault detection signal 70 only after a preset number of faulty signals have been detected. For example, on recognising a faulty signal, the calculation module may be configure to issue the fault detection signal 70 after a period of 10 seconds. In another action, which may be an alternative or complementary to the action previously described, the wind turbine controller 42 may be configured to yaw the nacelle to a reset-position which would trigger a reset of the nacelle yaw position sensor 50.

In a further alternative or complementary action, the local controller 42 may be configured to may use of the information received from the wind farm controller 12 in order to estimate a nacelle yaw position to replace the nacelle yaw position measured by the yaw position sensor 50. As a result the wind turbine 4 is then able to continue operating based on the estimated yaw position. This process is illustrated in FIG. 3, which once again shows the system boundaries of the farm controller 'FC' and the local controller 'LC'. The process should be considered as being able to run alongside the detection process described above with reference to FIG. 2, and may be triggered to operate a predetermined period of time following the issuance of the fault detection signal 70, for example one minute after such event.

In FIG. 3, the local controller 42 includes an estimation module 80 which is operable to determine an estimated nacelle yaw position. As such, the estimation module 80 receives the relative wind direction signal 63 from the addition module 60 at the local controller 42 and also receives the second absolute wind direction signal 65 from the averaging module 66 at the wind farm controller 12. The estimation module 80 includes a subtraction module 82 that subtracts the relative wind direction signal 51 from the absolute wind direction signal 65 and outputs an estimated nacelle yaw position signal 84 to the control module 54. So, it will be appreciated that the control module 54 is able to use the estimated nacelle yaw position signal 84 to replace the nacelle yaw position as determined by the yaw position sensor 50.

One significant benefit of this is that the wind turbine 4 can continue operating based on the estimated nacelle yaw position that is based on information gathered from the other wind turbines in the wind farm 2. Without this facility, the wind turbine would need to be placed into a safe mode and shut down, which would remove its contribution to the generated power output of the wind farm 2. Therefore, the invention improves the operating efficiency of the individual wind turbines, but also the efficiency of the wind farm overall.

The discussion above explains that the functionality provided by the invention is distributed between the local controller 42 and the wind farm controller 12, and the embodiment of FIGS. 2 and 3 illustrate how one form of this distributed functionality could be achieved.

An alternative will now be described with reference to FIGS. 4 and 5. In this embodiment, for simplicity the same reference numerals will be used to refer to the same or similar components/modules as in FIGS. 2 and 3.

Figure 4:
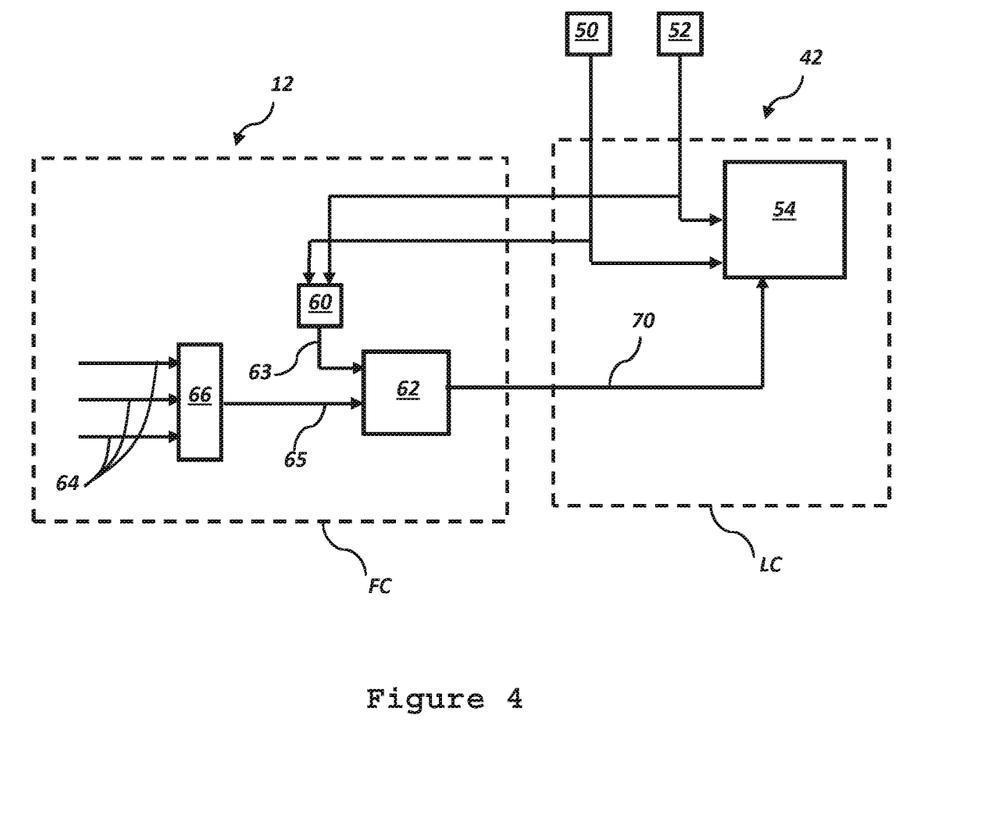
FIG. 4 is a schematic diagram of an alternative system to that of FIG. 2.

FIG. 4 illustrates the functionality in which a faulty signal of the nacelle yaw position sensor 50 is detected and, as such, should be compared with FIG. 2. In this embodiment, it will be noted that the wind farm controller 12, denoted by the system boundary 'FC', performs the role of determining that the nacelle yaw position sensor 50 of the wind turbine 4 is outputting faulty data and issuing the fault detection signal 70.

To this end, the wind farm controller 12 includes the averaging module 66, the addition module 60 and the calculation module 62. As in the previous embodiment, the addition module 60 receives, for example over the communications network 8, signals from the nacelle yaw position sensor 50 and the wind sensor 52 from the local controller 42 at the wind turbine 4 and combines these signals into an absolute wind direction signal 63. The calculation module 62 then compares that signal 63 to the averaged absolute wind direction signal 65 as received from the averaging module 66. As before, a fault detection signal 70 is issued in the event that the calculation module 62 determines that the first absolute wind direction signal 63 is outside of a predetermined error range of the second absolute wind direction signal 65.

The fault detection signal 70 is an input into the control module 54, the control module 54 being configured to take appropriate action as has been discussed above in relation to FIGS. 2 and 3.

It will be appreciated from FIG. 4 that that the process of detecting faulty data output from the nacelle yaw position sensor 50 is more centralised than the embodiment of FIG. 2 in that the wind farm controller 12 carries out the majority of the processing whilst the local controller 42 simply reacts to the issuance of fault detection signal 70.

A similarly centralised process for calculating an estimated nacelle yaw position will now be explained with reference to FIG. 5. It will be noted here that the estimation module 80 is within the system boundary of the wind farm controller FC. As such, the subtraction module 82 at the estimation module 80 calculates and outputs an estimated nacelle yaw position signal 84 based on i) the relative wind direction signal 51 that is receives from the wind sensor 52 of the wind turbine 4, and ii) the averaged wind direction signal 65 received from the averaging module 66. The estimated nacelle yaw position signal 84 is then input directly to the control system 54 of the local controller 42 which is then able to disregard its internally calculated value of nacelle yaw position.

Figure 5:
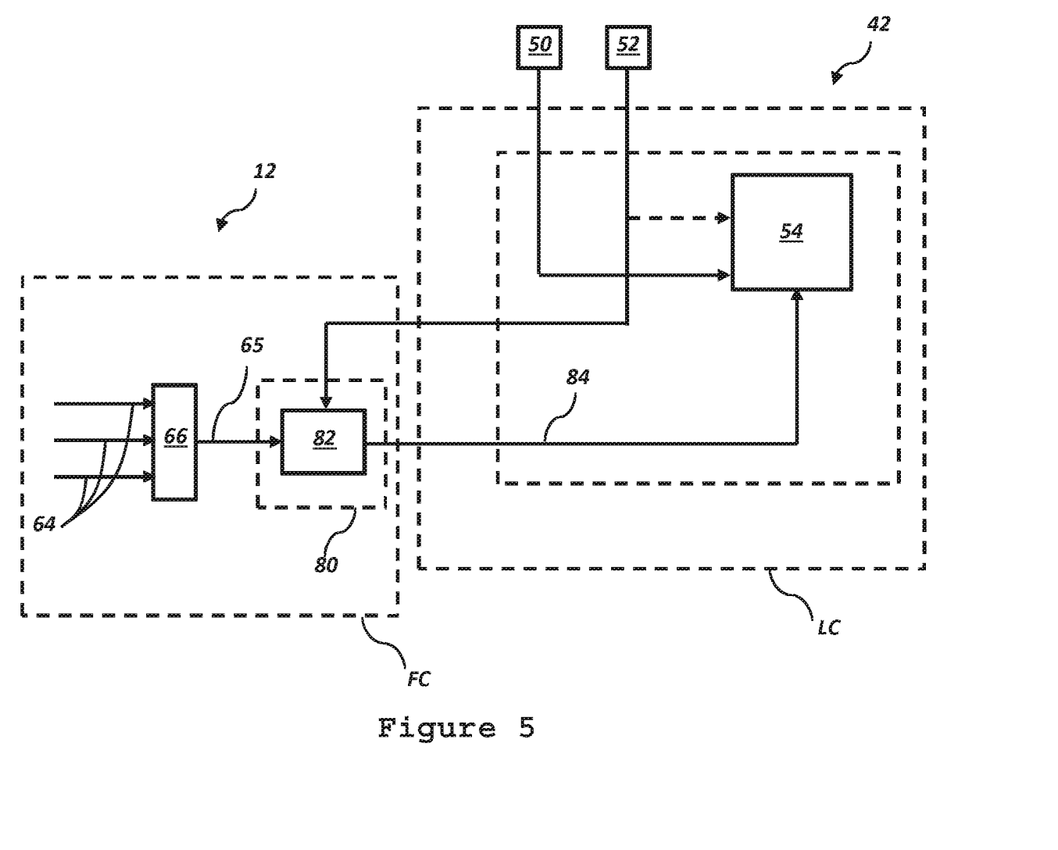
FIG. 5 is a schematic diagram of an alternative system to that of FIG. 3.

In one sense, FIGS. 2 and 3, and FIGS. 4 and 5, illustrate two contrasting approaches for achieving the functionality of the invention: the embodiments of FIGS. 2 and 3 adopt a part-centralised/part-localised approach in which the necessary calculations are distributed between the wind farm controller 12 at the central control station 6 and the local controller 42 at the wind turbine 4; whereas the embodiments of FIGS. 4 and 5 adopt a fully-centralised approach in which the wind farm controller 12 i) performs the diagnostic processes to detect inaccurate nacelle yaw position data from the wind turbine (FIG. 4) and simply sends a fault detection signal to the local controller of the wind turbine in question, and ii) performs the necessary calculations to estimate a nacelle yaw position and sends this data to the wind turbine 4. A centralised approach may have a benefit in that it the necessary computing hardware could be scaled upwards quite easily to adapt to higher processing requirement, and it also allows easier interaction with the operator for alarms/warning monitoring since a single computing unit is responsible for monitoring the nacelle position sensor performance for all of the wind turbines in the wind farm.

Figure 6:
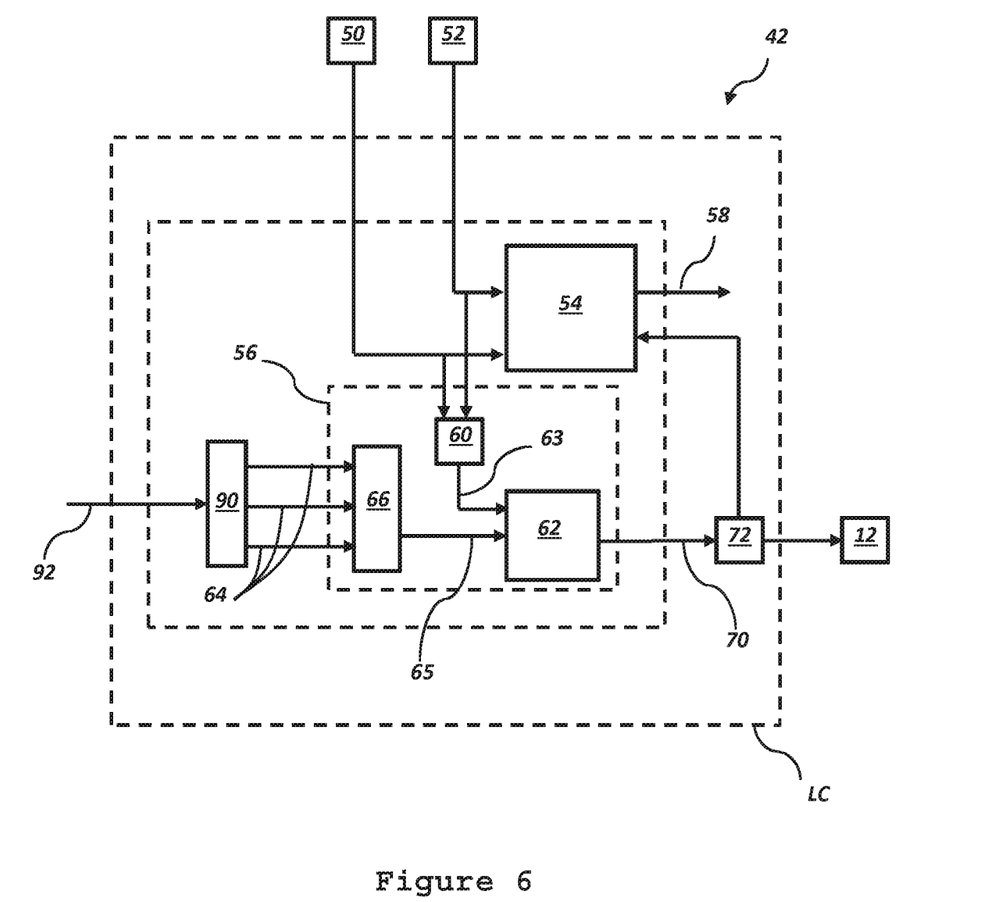
FIG. 6 is a schematic diagram of another alternative system to that of FIG. 2.
Figure 7:
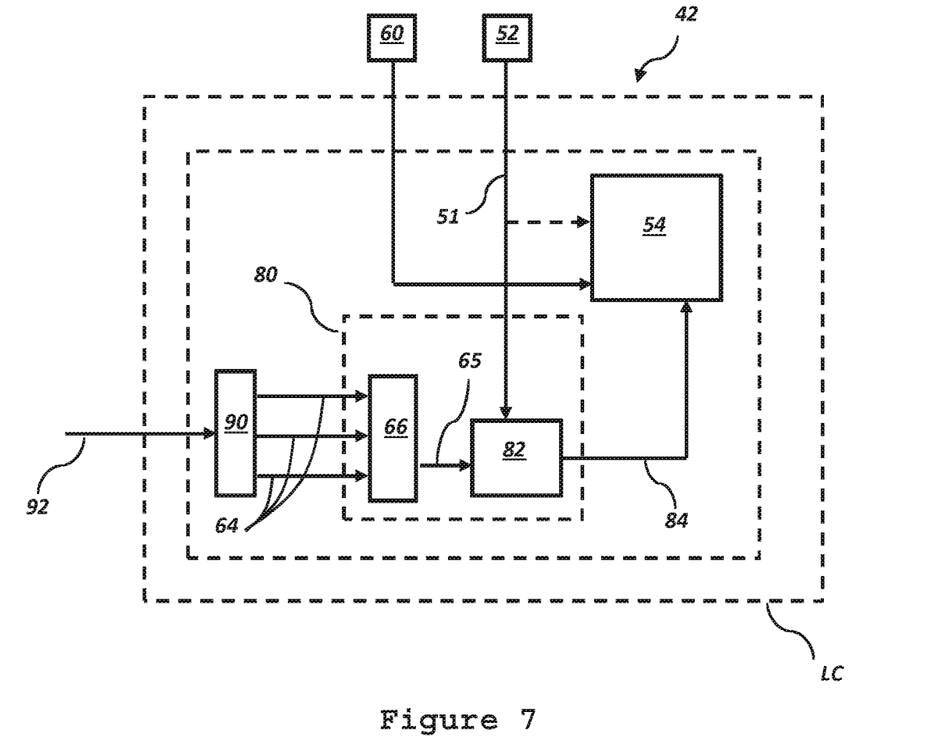
FIG. 7 is a schematic diagram of another alternative system to that of FIG. 3.

A still further approach will now be explained with reference to FIGS. 6 and 7, in which FIG. 6 illustrates a localised diagnostic process for determining that the nacelle yaw position sensor 50 of a wind turbine 4 is outputting inaccurate data, and in which FIG. 7 illustrates the estimation process for determining an estimated value of nacelle yaw position based on data gathered from other wind turbines in the wind farm. Again, the same reference numerals will be used to refer to the same or similar components/modules as in the previous embodiments.

Referring firstly to FIG. 6, the local controller 42 incorporates the functionality of the diagnostic module 56 and includes the averaging module 66, the additional module 60 and the calculation module 62.

The averaging module 66 receives absolute wind direction signals 64 from the other wind turbines 4 in the wind farm 2. Note that in this embodiment, the individual signals 64 are generated by a routing module 90 that converts the serial data stream 92 received via the communications network 8 from the other turbines 4 into the plurality of absolute wind direction signals 64 ready to be processed by the averaging module 66. Therefore all relevant information from all relevant wind turbines is collected and presented to the averaging module 66 for processing.

In the same way as previous embodiments, the averaging module 66 converts the plurality of input signals 64 into a single signal 65 representing an average absolute wind direction value. This signal 65 is then input into the calculation module 62 together with a local absolute wind direction signal 63 as generated by the addition module 60 based on the input signals received by the nacelle yaw position sensor 50 and the wind sensor 52.

The calculation module 62 then compares the first absolute wind direction signal 63 to the second (averaged) absolute wind direction signal 65 to determine if the two signals are within a predetermined error range. As before a fault detection signal 70 is issued in the event that the calculation module 62 determines that the first absolute wind direction signal 63 is outside of a predetermined error range of the second absolute wind direction signal 65. The fault reporting module 72 would be triggered by the fault detection signal 70 to send a fault report to the wind farm controller 12 as part of the SCADA error reporting system, and to feed back to the control module 54 that restorative action should be taken.

As in previous embodiments, one approach here would simply be to shut down the wind turbine. However, FIG. 7 illustrates an alternative option in which an estimated nacelle yaw position is calculated. In contrast to the previous embodiments, however, it will be noted that the estimation module 80 includes the subtraction module 82, but also the averaging module 66. In this way, the estimation module 80 processes all of the absolute wind direction signals 64 received from the other wind turbines 4 in the wind farm 2 via the routing module 90 and outputs a single average absolute wind direction signal 65 to the subtraction module 82. The subtraction module 82 then calculates and outputs an estimated nacelle yaw position signal 84 based on i) the relative wind direction signal 51 that is receives from the wind sensor 52 of the wind turbine 4, and ii) the averaged wind direction signal 65 received from the averaging module 66. The estimated nacelle yaw position signal 84 is then input directly to the control module 54 of the local controller 42 which is then able to disregard its internally calculated value of nacelle yaw position.

Although various embodiments have been described in detail in the discussion above, the skilled person will understand that various modifications may be made without departing from the scope of the invention as defined by the claims.

In this description it will be appreciated that the various modules and functional components are not limited to being embodied in a particular processing environment and are merely a useful way of representing that functionality in a readily understandable way. As such, the skilled person will understand that each of the modules/components is not necessarily separate from a software implementation point of view. Equally, the functional modules/components could be implemented in software or hardware.

It will be also understood that the local controller and the wind farm controller include, if not explicitly stated here, appropriate processors, volatile and non-volatile memory, I/O interfaces and the like to implement the functionality that has been described. The specific hardware and configuration required to implement the functionality is not part of the invention and is considered to be within the abilities of the skilled person or team.

In the above description, it has been explained that FIGS. 2 and 3 illustrate a 'part-centralised' implementation of a diagnostic process and an estimation process, respectively, that FIGS. 4 and 5 illustrate a 'fully-centralised' alternative implementation of those processes, and that FIGS. 6 and 7 illustrate a 'localised' implementation of those processes.

However, it should be appreciated that within the scope of the invention it is envisaged that the diagnostic process and the estimation process could be implemented as different approaches. For example, the diagnostic process could be implemented as partly-centralised (i.e. FIG. 2) and the estimation process could be implemented as fully-centralised.

In this discussion, the functionality of one specific wind turbine controller has been described. However, it should be appreciated that the same functionality in practice will be provided in some or all of the other wind turbines in the wind farm, whether locally at the local controller of a specific wind turbine, or centrally at the wind farm controller.

The invention claimed is:

1. A method of verifying a nacelle yaw position sensor associated with a first wind turbine in a wind farm including a plurality of other wind turbines, the method comprising:
   determining a first absolute wind direction signal associated with the first wind turbine;
   determining a second absolute wind signal direction signal associated with the plurality of other wind turbines;
   comparing the first absolute wind direction signal to the second absolute wind direction signal; and
   in the event that the first absolute wind direction signal is beyond a predetermined error range of the second absolute wind direction signal, triggering a reset of the nacelle yaw position sensor by yawing the nacelle to a reset-position.

2. The method of claim 1, wherein the second absolute wind direction signal represents an averaged value absolute wind direction for the plurality of other wind turbines.

3. The method of claim 2, wherein the second absolute wind direction signal represents a weighted average value of a plurality of absolute wind direction signals each associated with a respective one of the plurality of other wind turbines, and wherein each of the plurality of absolute wind turbine direction signals is weighted depending on a distance from the first wind turbine to the respective one of the plurality of other wind turbines from which the absolute wind turbine direction signal is received.

4. The method of claim 1, further comprising:
   in the event that the first absolute wind direction signal is beyond the predetermined error range of the second absolute wind direction signal, issuing a nacelle yaw position sensor fault signal; and
   in response to the issuance of the fault signal, using the second absolute wind direction signal to determine an estimated nacelle yaw position signal associated with the first wind turbine.

5. The method of claim 4, wherein the estimated nacelle yaw position signal is determined by subtracting a relative wind direction signal associated with the first turbine from the second absolute wind direction signal.

6. The method of claim 4, wherein the estimated nacelle yaw position signal is used by a controller local to the first turbine to control the yaw position of the nacelle.

7. The method of claim 1, wherein the first absolute wind direction signal is determined by a local controller at the first wind turbine.

8. The method of claim 7, wherein the comparison of the first and second absolute wind direction signals is performed by the local controller.

9. The method of claim 7, wherein the second absolute wind direction signal is determined by a wind farm controller and transmitted to the local controller.

10. The method of claim 7, wherein the second absolute wind direction signal is determined by the local controller.

11. The method of claim 2, wherein the first absolute wind direction signal is determined by a wind farm controller.

12. The method of claim 11, further comprising:
in the event that the first absolute wind direction signal is beyond the predetermined error range of the second absolute wind direction signal, issuing a nacelle yaw position sensor fault signal,
wherein the first and second absolute wind direction signal are determined by the wind farm controller, and
wherein the comparison of the first and second absolute wind direction signals is performed by the wind farm controller, whereby the fault signal is generated by the wind farm controller and transmitted to a local controller.

13. A wind farm including a first wind turbine and a plurality of other wind turbines, including a controller configured to:
determine a first absolute wind direction signal associated with the first wind turbine;
determine a second absolute wind signal direction signal associated with the plurality of other wind turbines;
compare the first absolute wind direction signal to the second absolute wind direction signal; and
in the event that the first absolute wind direction signal is beyond a predetermined error range of the second absolute wind direction signal, trigger a reset of the nacelle yaw position sensor by yawing the nacelle to a reset-position.

14. A controller for a wind turbine or wind farm including a plurality of wind turbines, the controller configured to:
determine a first absolute wind direction signal associated with a first wind turbine of the plurality of wind turbines;
determine a second absolute wind signal direction signal associated with a portion of the plurality of wind turbines that does not include the first wind turbine;
compare the first absolute wind direction signal to the second absolute wind direction signal; and
in the event that first absolute wind direction signal is beyond a predetermined error range of the second absolute wind direction signal, trigger a reset of the nacelle yaw position sensor by yawing the nacelle to a reset-position.

15. The controller of claim 14, wherein in determining the second absolute wind direction signal, the controller is a first controller configured to receive said second absolute wind direction signal from a second controller that is remote from the first controller.

* * * * *